United States Patent [19]
Agarwal et al.

[11] Patent Number: 5,758,176
[45] Date of Patent: May 26, 1998

[54] METHOD AND SYSTEM FOR PROVIDING A SINGLE-INSTRUCTION, MULTIPLE-DATA EXECUTION UNIT FOR PERFORMING SINGLE-INSTRUCTION, MULTIPLE-DATA OPERATIONS WITHIN A SUPERSCALAR DATA PROCESSING SYSTEM

[75] Inventors: Ramesh Chandra Agarwal, Yorktown Heights, N.Y.; Randall Dean Groves, Austin, Tex.; Fred Gehrung Gustavson, Briarcliff Manor, N.Y.; Mark Alan Johnson, Austin; Brett Olsson, Round Rock, both of Tex.

[73] Assignee: International Business Machines Corporation, Armonk, N.Y.

[21] Appl. No.: 313,970

[22] Filed: Sep. 28, 1994

[51] Int. Cl.$^6$ .................................................. G06F 9/38
[52] U.S. Cl. .................... 395/800; 375/375; 364/230; 364/231.9; 364/261.3; 364/DIG. 1
[58] Field of Search .............................. 395/800, 375, 395/250; 364/131–134

[56] References Cited

U.S. PATENT DOCUMENTS

| | | | |
|---|---|---|---|
| 4,752,873 | 6/1988 | Shonai et al. | 395/800 |
| 4,783,738 | 11/1988 | Li et al. | 395/800 |
| 4,831,515 | 5/1989 | Kamada et al. | 395/375 |
| 5,150,470 | 9/1992 | Hicks et al. | 395/375 |
| 5,197,137 | 3/1993 | Kumar et al. | 395/375 |
| 5,442,760 | 8/1995 | Rustad et al. | 395/375 |
| 5,465,373 | 11/1995 | Kahle et al. | 395/800 |

*Primary Examiner*—Alpesh M. Shah
*Attorney, Agent, or Firm*—Anthony V. S. England; Andrew J. Dillon

[57] ABSTRACT

A single-instruction, multiple-data (SIMD) execution unit for use in conjunction with a superscalar data processing system is provided. The SIMD execution unit is coupled to a branch execution unit within a superscalar processor. The branch execution unit fetches instructions from memory and dispatches vector processing instructions to the SIMD execution unit via the instruction bus. The SIMD execution unit includes a control unit and a plurality of processing elements for performing arithmetic operations. The processing elements further include a register file having multiple registers and an arithmetic logic unit coupled to the register file. The arithmetic logic unit may include a fixed-point unit for performing fixed-point vector calculations and a floating-point unit for performing floating-point vector calculations. Once the control unit within the SIMD execution unit receives a vector instruction, the control unit translates the instruction into commands for execution by selected processing elements within the SIMD execution unit. If such a vector instruction requires access to memory, a fixed point execution unit within the superscalar processor may be utilized to calculate a memory address which is then utilized by the SIMD execution unit to access memory.

11 Claims, 5 Drawing Sheets

5,758,176

METHOD AND SYSTEM FOR PROVIDING A SINGLE-INSTRUCTION, MULTIPLE-DATA EXECUTION UNIT FOR PERFORMING SINGLE-INSTRUCTION, MULTIPLE-DATA OPERATIONS WITHIN A SUPERSCALAR DATA PROCESSING SYSTEM

CROSS-RFERENCE TO RELATED APPLICATION

The present application is related to U.S. patent application Ser. No. 08/313,971, now U.S. Pat. No. 5,513,866, entitled "Method and System For Dynamically Reconfiguring a Register File in a Vector Processor," Attorney Docket No. AT9-94-046, filed of even date herewith by the inventors hereof, assigned to the assignee herein, and incorporated herein by reference.

BACKGROUND OF THE INVENTION

1. Technical Field

The present invention relates in general to an improved data processing system, and in particular to an improved central processing unit architecture. Still more particularly, the present invention relates to an improved central processing unit architecture having vector processing capability.

2. Description of the Related Art

In the art of data processing system design, the speed and computational power of the data processing system has continuously increased as designers make advances in semiconductor design and manufacturing techniques, and as the architectural design of the central processing unit (CPU) is improved. One such improvement in CPU architecture is the addition of pipelining.

Pipelining increases the speed of processing a sequence of instructions by starting the execution of all instructions before the execution of all previous instructions is completed. For example, the CPU may begin fetching an instruction from memory while another part of the CPU is decoding a previously fetched instruction. Thus, pipelining does not speed up the execution of any one instruction, but it may speed up the processing of a sequence of instructions because succeeding instructions are being processed in the CPU before the processing of prior instructions has been completed.

Another architectural improvement in CPU design is the utilization of special processor functional blocks which are optimized for rapidly performing a limited set of instructions. For example, some CPUs include functional blocks for performing only fixed-point arithmetic, or only floating-point arithmetic, or for processing only branch instructions. These functional blocks, which may be referred to as execution units, may perform their assigned limited functions much faster than a single general purpose processor is able to perform the same function.

When the vertical parallelism achieved by pipelining is combined with the horizontal parallelism achieved by utilizing multiple execution units the computational power of the CPU is further increased. Such a combination of vertical and horizontal parallelism permits the hardware to take a sequential instruction stream and dispatch (or issue) several instructions per clock cycle into the pipelines associated with the execution units. A CPU that utilizes multiple pipelined execution units may be called a superscalar processor.

FIG. 1 is a high-level block diagram of such a superscalar data processing system. As illustrated, superscalar data processing system 100 includes branch execution unit 102, which is coupled to memory 104 via instruction bus 106 and address bus 108. Branch execution unit 102 may fetch multiple instructions from memory 104 during a single clock cycle and dispatch such instructions to an appropriate execution unit via instruction dispatch buses 110.

Another execution unit within superscalar data processing system 100 is load/store execution unit 112. Load/store execution unit 112, which may be implemented within a fixed-point execution unit, performs address calculations and generates memory requests for instructions requiring memory access. Load/store execution unit 112 provides address information to memory 104 via address bus 114.

Floating-point execution unit 116 may also be included within superscalar data processing system 100. Floating-point execution unit 116 is optimized to receive, buffer, and execute floating-point calculations. Floating-point execution unit 116 may be coupled to memory 104 via data bus 118.

Fixed-point execution unit 120 is yet another execution unit which may be included within superscalar data processing system 100. Fixed-point execution unit 120, which may be coupled to memory 104 via data bus 122, may be utilized to perform integer calculations. In some implementations, fixed-point execution unit 120 may include the load/store functions performed by load/store execution unit 112. One example of such a superscalar data processing system having multiple pipelined execution units is the processor manufactured under the trademark "IBM RISC System/6000 Model 59H" by International Business Machines Corporation (IBM) of Armonk, N.Y.

In many prior art CPUs, a single instruction stream directs the CPU to perform operations on a single data stream. That is, each CPU instruction performs an operation on defined data to produce one calculation per instruction. Such CPUs may be referred to as "single- instruction single-data" (SISD) processors. One problem with SISD processors may be seen during the execution of software which performs the same instruction utilizing multiple data operands. If the application program requires the same CPU instruction to be performed using multiple data operands, the CPU may be programmed to loop through a short software segment many times. That is, the CPU may be programmed to perform a "DO loop" to perform a particular operation on multiple data operands. During such a DO loop, the instruction performed on multiple operands must be recalled from memory in each pass through the DO loop. This process of repeatedly recalling a single instruction may reduce the instruction bandwidth of the CPU. Such a reduction in available instruction bandwidth means that the CPU may not be able to fetch instructions for other execution units to keep all the pipelines filled.

Another improvement in CPU architecture permits the CPU to utilize a single instruction to operate on multiple data streams or multiple operands. Such a CPU architecture is utilized in a "single-instruction multiple-data" (SIMD) processor. In an SIMD processor, high-level operations, invoked by a single instruction, are performed on vectors, which are linear arrays of numbers. A typical vector operation might add two 64-entry, floating-point vectors to obtain a single 64-entry vector. This vector instruction may be equivalent to an entire DO loop, in which each iteration of the DO loop includes a computation of one of the 64 elements of the result, an update of the indices, and a branch back to the beginning of the DO loop. For an instructional discussion of vector processing see chapter 7 of *Computer Architecture, A Quantitative Approach* by John L. Hennessy and David A. Patterson, published by Morgan Kaufmann Publishers, Inc., Palo Alto, Calif., pages 351–379.

Another advantage of using an SIMD-parallel processor is that the computation of each result, or element in a vector, is independent of the computation of a previous result. This allows a very deep pipeline without generating data hazards. Data hazards occur when the execution of an operation depends upon the result of a previously scheduled operation.

Another advantage of using an SIMD-parallel processor is that vector instructions that access memory have a known memory access pattern. For example, if the vector's elements are all stored in adjacent memory locations, then fetching the vector from a set of heavily interleaved memory banks works well. When recalling a vector from main memory, the high latency of initiating a main memory access (compared with the latency of accessing a cache memory) may be amortized over the access for an entire vector rather than a single element. Thus, the cost of the main memory latency may be incurred once for the entire vector, rather than for each word of the vector.

Yet another advantage of using an SIMD-parallel processor is that such a single vector instruction may specify a large amount of computational work. The vector instruction may be equivalent to executing an entire DO loop. Thus, the instruction bandwidth requirement of the CPU is reduced, and the "Flynn bottleneck," which is a limitation that prevents fetching and issuing of more than a few instructions per clock cycle, is considerably mitigated.

Because of the advantages described above, vector operations may be executed faster than a sequence of scalar operations on the same number of data elements. Therefore, the problem remaining in the prior art is to provide a method and apparatus for efficiently performing vector operations in a CPU having a superscalar architecture. It should also be apparent that a need exists for a SIMD execution unit that is capable of interfacing with known superscalar processors.

SUMMARY OF THE INVENTION

It is therefore one object of the present invention to provide an improved data processing system.

It is another object of the present invention to provide an improved central processing unit architecture.

It is yet another object of the present invention to provide an improved central processing unit architecture having vector processing capability.

The foregoing objects are achieved as is now described. A single-instruction, multiple-data (SIMD) execution unit for use in conjunction with a superscalar data processing system is provided. The SIMD execution unit is coupled to a branch execution unit within a superscalar processor. The branch execution unit fetches instructions from memory and dispatches vector processing instructions to the SIMD execution unit via the instruction bus. The SIMD execution unit includes a control unit and a plurality of processing elements for performing arithmetic operations. The processing elements further include a register file having multiple registers and an arithmetic logic unit coupled to the register file. The arithmetic logic unit may include a fixed-point unit for performing fixed-point vector calculations and a floating-point unit for performing floating-point vector calculations. Once the control unit within the SIMD execution unit receives a vector instruction, the control unit translates the instruction into commands for execution by selected processing elements within the SIMD execution unit. If such a vector instruction requires access to memory, a fixed point execution unit within the superscalar processor may be utilized to calculate a memory address which is then utilized by the SIMD execution unit to access memory.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
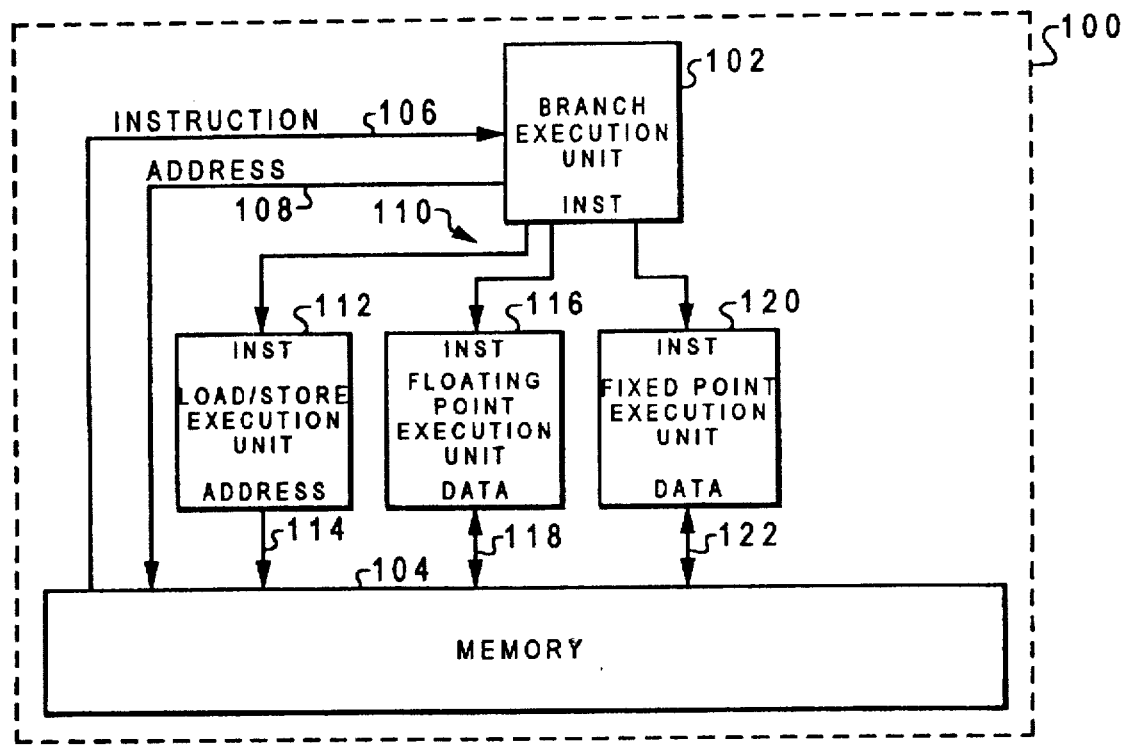
FIG. 1 a high-level block diagram of a superscalar processor which is known in the prior art.
Figure 2:
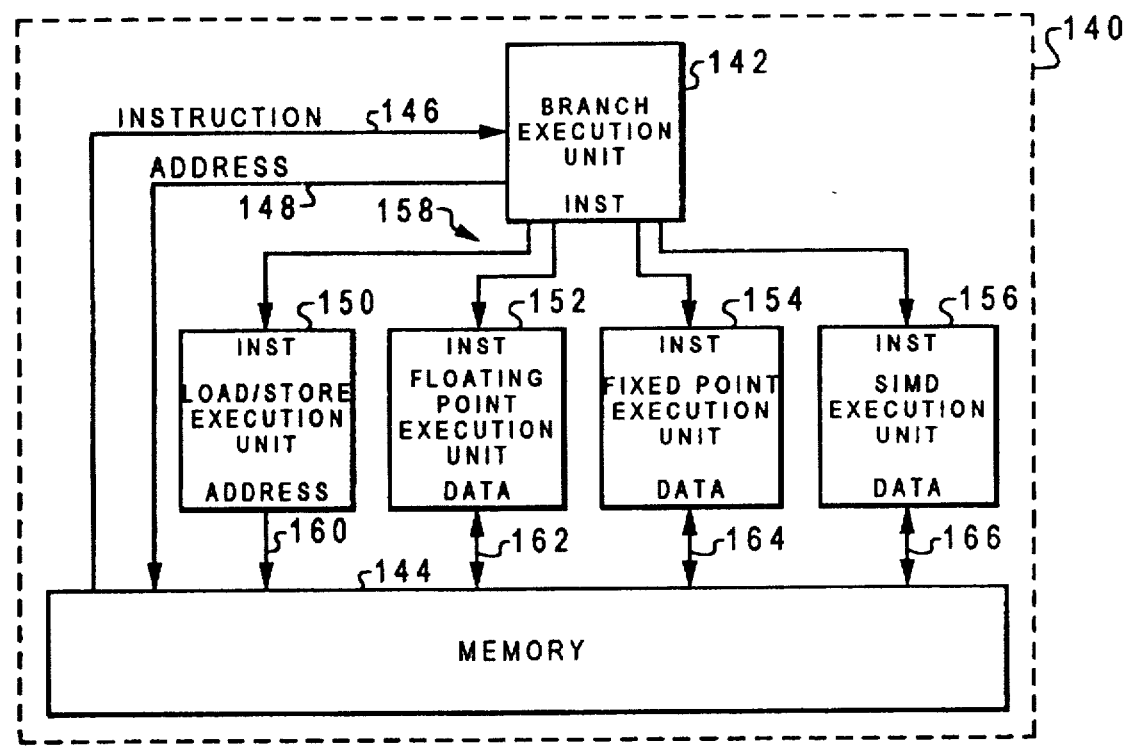
FIG. 2 depicts a high-level block diagram of a superscalar data processing system having an SIMD execution unit in accordance with the method and system of the present invention.

With reference now to the figures and in particular with reference to FIG. 2, there is depicted a high-level block diagram of a superscalar data processing system having an SIMD execution unit in accordance with the method and system of the present invention. As illustrated superscalar data processing system 140 includes branch execution unit 142 which is coupled to memory 144 via instruction bus 146 and address bus 148. Branch execution unit 142 fetches instructions from memory 144 and dispatches such instructions to execution units 150–156, via instruction dispatch buses 158. Memory 144 may be implemented in different levels having different speeds and capacities. Such levels of memory may be structured such that from the viewpoint of any particular level in the hierarchy, the next lower level from the processor is considered to be a cache. A cache memory is an auxiliary memory that provides a buffering capability by which the relatively slow and increasingly large main memory can interface to branch execution unit 142 (or a next higher level of memory) at a cycle time much closer to that of branch execution unit 142.

In the example illustrated in FIG. 2, execution unit 156 is an SIMD execution unit. Thus, within superscalar data processing system 140, branch execution unit 142 interfaces with SIMD execution unit 156 as another "execution class" among the classes of execution units in the superscalar data processing system.

Other execution units within superscalar data processing system 140 include load/store execution unit 150, floating-point execution unit 152, and fixed-point execution unit 154. Load/store execution unit 150, which is coupled to memory 144 via bus 160, is utilized to calculate addresses and provide such addresses to memory 144 during the execution of instructions that require memory access. Load/store execution unit 150 may be utilized to provide an address to memory 144 during the execution of instructions in other execution units. Floating-point execution unit 152, which is coupled to memory 144 via bus 162, is utilized to perform floating-point arithmetic operations. Fixed-point execution unit 154 is coupled to memory 144 via bus 164. SIMD execution unit 156 is coupled to memory 144 via bus 166.

Figure 3:
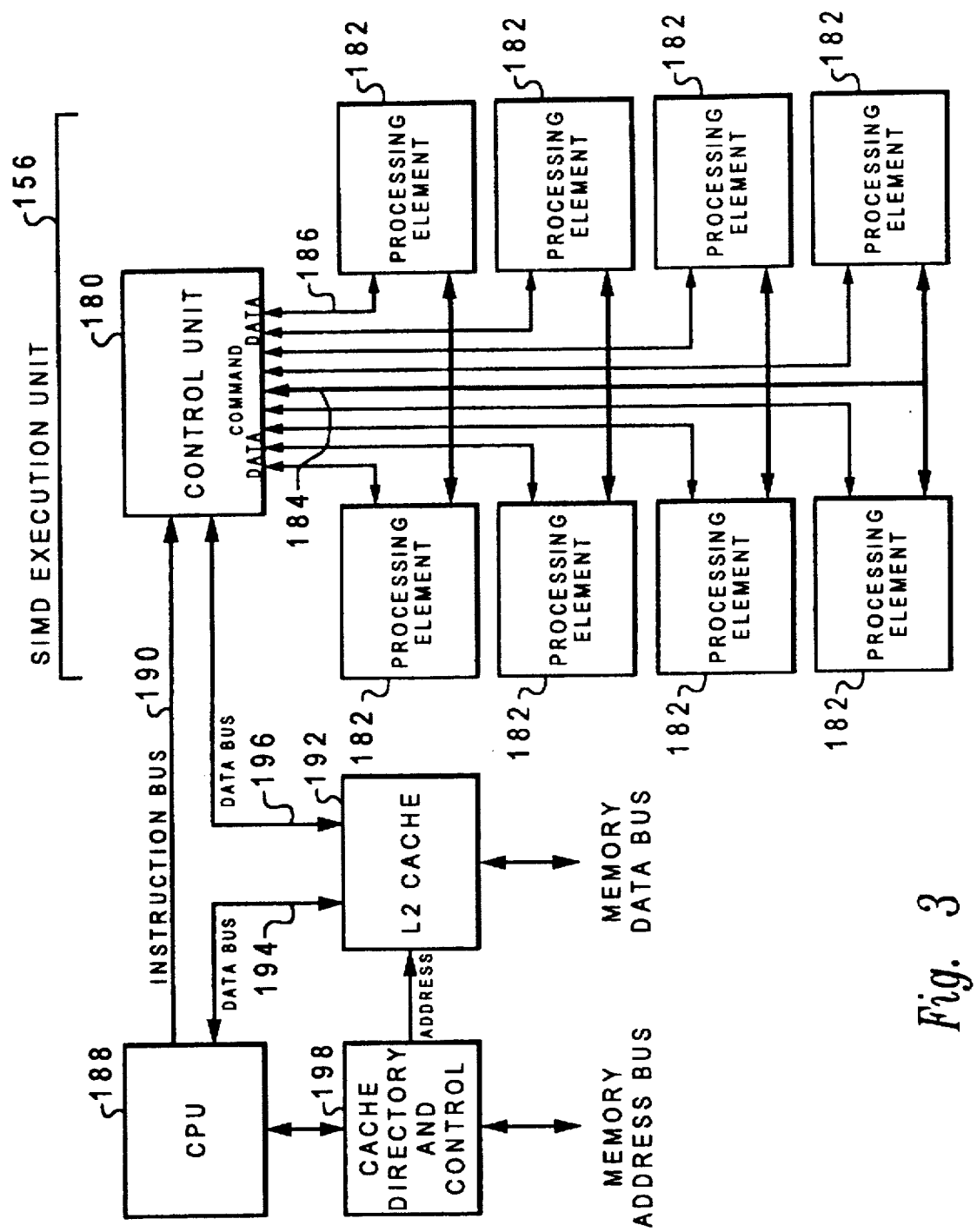
FIG. 3 is a high-level block diagram which further illustrates the components within the SIMD execution unit, and the interface between the SIMD execution unit and the superscalar data processing system in accordance with the method and system of the present invention.

With reference now to FIG. 3, there is depicted a high-level block diagram which further illustrates the components within the SIMD execution unit, and the interface between the SIMD execution unit and the superscalar data processing system in accordance with the method and system of the present invention. As illustrated, SIMD execution unit 156 includes control unit 180 and a plurality of matrix processing elements 182. Control unit 180 dispatches commands to selected processing elements 182 via command bus 184. Control unit 180 transfers data to, and receives data from, processing elements 182 via data buses 186. Each matrix processing element 182 is coupled to control unit 180 with a separate data bus 186.

Matrix control unit 180 receives vector processing instructions from CPU 188 via instruction bus 190. An example of an implementation of CPU 188 is found in the system sold under the trademark "IBM RISC System/6000 Model 59H" by IBM Corporation in Armonk, N.Y. with the following modifications:

provide external access to the instruction bus from the branch execution unit, including control information;

provide an additional register to specify the vector size for vector load and store Instructions;

provide external access to the low-order address bits and the vector size for vector load and store Instructions; and provide support for dispatching memory access requests for the SIMD execution unit to memory.

Level-two cache (L2 cache) 192 may be used to store data and instructions for all execution units, including SIMD execution unit 156. An example of an implementation of L2 cache 192 is found in the system sold under the trademark "IBM RISC System/6000 Model 59H" by IBM Corporation. L2 cache 192 is coupled to CPU 188 via data bus 194. L2 cache 192 is also coupled to control unit 180 within SIMD execution unit 156 via data bus 196. Cache controller 198 provides address signals to L2 cache 192. An example of an implementation of cache controller 198 is found in the system sold under the trademark "IBM RISC System/6000 Model 59H" by IBM Corporation. The address utilized to produce such address signals may be computed by load/store execution unit 150 (see FIG. 2).

Figure 4:
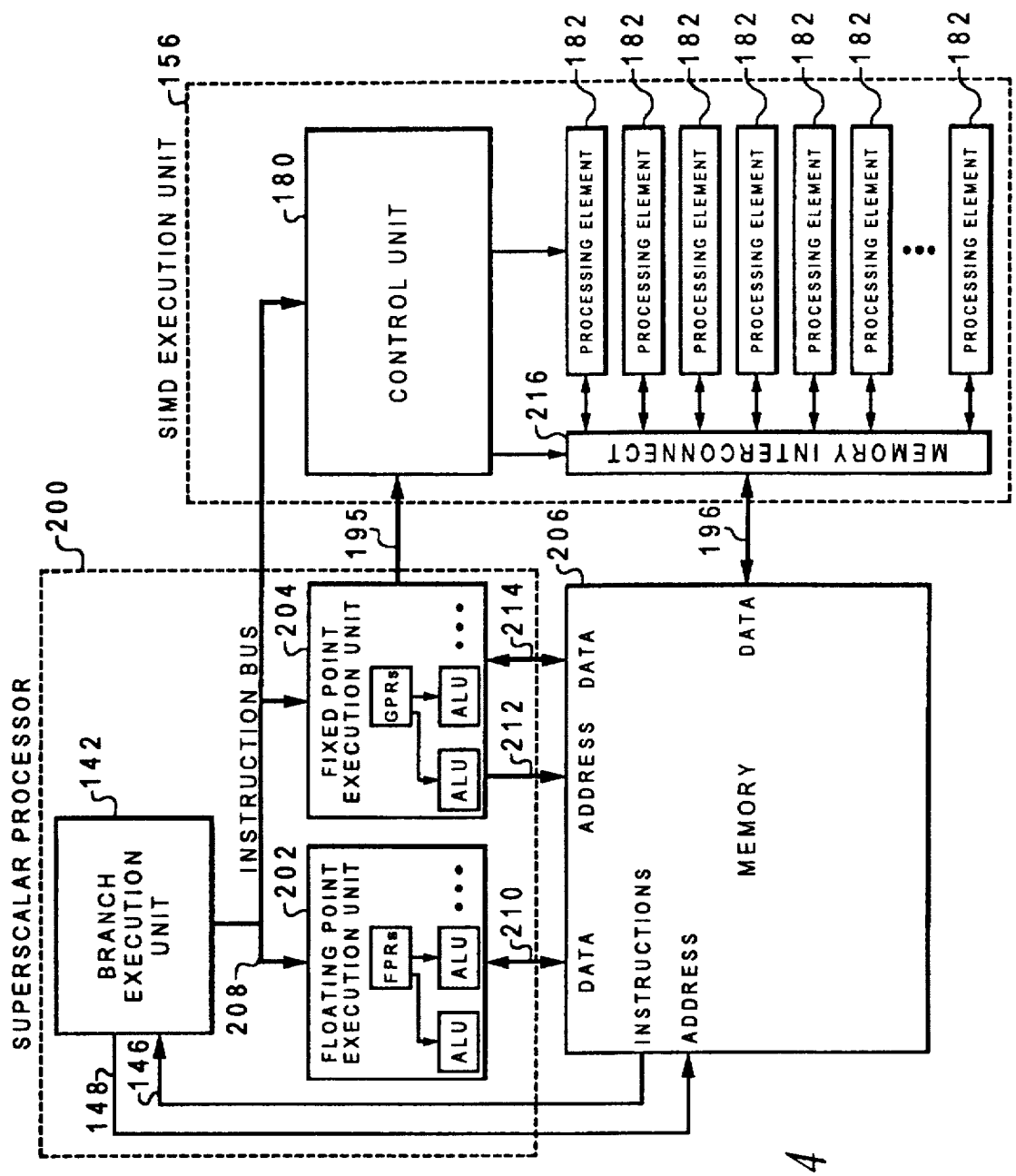
FIG. 4 depicts a more detailed block diagram of the interface between a superscalar processor, a memory, and an SIMD execution unit in accordance with the method and system of the present invention.

With reference now to FIG. 4, there is depicted a more detailed block diagram of the interface between a superscalar processor, a memory, and an SIMD execution unit in accordance with the method and system of the present invention. As illustrated, superscalar processor 200 includes branch execution unit 142, floating-point execution unit 202, and fixed-point execution unit 204. Branch execution unit 142 provides address signals to memory 206 via address bus 148, and receives instructions from memory 206 via instruction bus 146. Such instructions are then dispatched to selected execution units, including floating-point execution unit 202, fixed-point execution unit 204, and SIMD execution unit 156, via instruction bus 208. Branch execution unit 142 dispatches instructions to an execution unit that is designed to perform the type of operation represented by the instruction. For example, an instruction representing a floating-point arithmetic operation is dispatched by branch execution unit 142 to floating-point execution unit 202.

Floating-point execution unit 202 may include a plurality of arithmetic logic units (ALUs) coupled to a group of "floating-point registers" (FPRs). Floating-point execution unit 202 is coupled to memory 206 via data bus 210. Similarly, fixed-point execution unit 204 may include a plurality of arithmetic logic units coupled to a group of "general purpose registers" (GPRs). Fixed-point execution unit 204 may be coupled to memory 206 via address bus 212 and data bus 214.

Within SIMD execution unit 156, control unit 180 controls a plurality of processing elements 182 and memory interconnect 216. In a preferred embodiment, control unit 180 may include three main functional units: (1) an instruction control unit; (2) a load data unit; and (3) a store data unit. The instruction control unit may be further divided into (a) an instruction assembly unit, (b) an instruction expansion unit, and (c) a command dispatch unit. Other tasks which may be performed in control unit 180 include performance monitoring and error logging.

The instruction assembly subunit within control unit 180 provides the instruction and control interface with superscalar processor 200 by receiving, buffering, and pipelining vector instructions dispatched from branch execution unit 142. Control unit 180 also receives and buffers storage access control information from fixed-point execution unit 204 transmitted on interface bus 195. Such storage access control information may include addresses calculated by fixed-point execution unit 204. Control unit 180 holds dispatched instructions and associated control information until branch execution unit 142 commits the instruction to complete execution. After branch execution unit 142 commits an SIMD execution unit instruction to complete, no previously dispatched instruction can cause the SIMD execution unit instruction to abort.

An instruction queue within matrix control unit 180 stores instructions awaiting execution. If the instruction queue is nearly full, matrix control unit 180 notifies branch execution unit 142 that the SIMD execution unit 156 is unable to accept additional instructions. Instructions are released from the instruction queue for execution after receiving a completion signal from branch execution unit 142 which commits the instruction to complete. Branch execution unit 142 commits an instruction to complete after evaluating data, address, and control flow hazards that may occur because of out-of-order execution of instructions in other execution units.

The instruction expansion unit within the instruction control unit translates SIMD execution unit instructions into commands which may be dispatched to selected processing elements 182 and executed simultaneously within such processing elements 182 to carry out the SIMD execution unit instruction dispatched from branch execution unit 142. When the instruction expansion subunit dispatches commands to several processing elements 182, such processing elements may be coordinated to provide portions of a vector calculated in a vector operation. For example, if a vector contains sixteen elements, eight processing elements 182 may be utilized to execute the two SIMD operations that are required to implement the full 16-element vector operation.

Each SIMD operation produces an eight-element result, where one element of the result is produced on each of the eight processing elements 182.

The command dispatch unit within the instruction control unit dispatches subsection commands (which includes matrix processing element commands) as dispatch conditions are met. The command dispatch logic enables out-of-order execution of matrix processing element commands generated by the instruction expansion unit. Such out-of-order execution allows parallel execution of loads or stores with arithmetic operations.

The load data unit within control unit 180 is capable of loading one to eight 32-bit or 64-bit elements (i.e., individual values in a vector) from any word-aligned address in memory to any single processing element 182, where such elements will be stored into consecutive registers in the processing element. The register structure in processing elements 182 are discussed in greater detail with reference to FIG. 5. The load data unit may also support other types of load operations including loading a single 32-bit or 64-bit element and routing individual bits to a processing element.

When SIMD execution unit 156 sends a request for data to memory 206, the data requested may not be sent from memory 206 to SIMD execution unit 156 in the order the data was requested. For example, if requested data resides in L2 cache memory (included in the hierarchical structure of memory 206), memory 206 may respond by sending data to SIMD execution unit 156 within a short period of time. However, if requested data is not located in the relatively fast L2 cache memory, such requested data may be retrieved from a memory location having a relatively high latency compared with the latency of L2 cache. This means that memory 206 is able to send some data to SIMD execution unit 156 sooner than other data. While SIMD execution unit 156 is waiting for data from a slower memory, other subsequently requested data may be sent by memory 206 to SIMD execution unit 156 before earlier requested data is sent. To keep track of what data is received as a result of a particular memory request, memory requests from SIMD execution unit 156 are assigned an identifier which is then reassigned to the requested data from memory 206 and transferred with the data to SIMD execution unit 156.

The store data unit within control unit 180 provides the ability to store data from processing elements 182 to memory 206. The store data unit also provides the ability to store an entire row or column of data residing in a plurality of processing elements 182.

Figure 5:
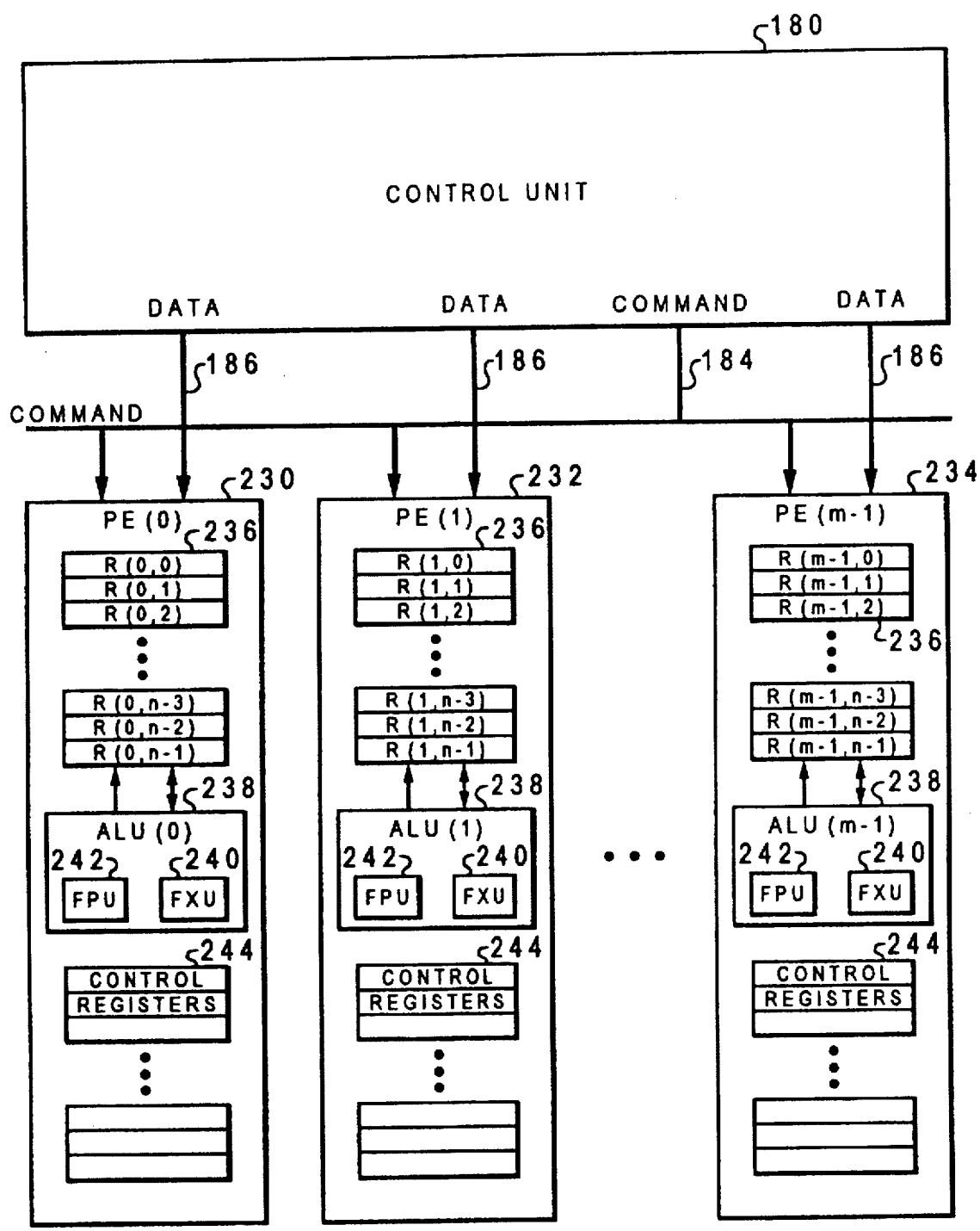
FIG. 5 is a more detailed representation of a processing element in accordance with the method and system of the present invention.

With reference now to FIG. 5, there is depicted a more detailed representation of a processing element in accordance with the method and system of the present invention. As illustrated, a plurality of processing elements 230–234 are coupled to control unit 180 via a common command bus 184 and a plurality of individual data buses 186.

In one embodiment of the present invention, processing elements 230–234 include a register file 236 which may include 512 64-bit registers. Such a register file may include six ports allowing a load or store operations to proceed in parallel with an arithmetic operation. The register file stores operands and results for vector operation performed by the processing element.

Each processing element 230–234 may also include an arithmetic logic unit 238. Such an arithmetic logic unit may include both a fixed-point execution unit 240 and a floating-point execution unit 242. Preferably both fixed-point execution unit 240 and floating-point execution unit 242 have a design similar to fixed-point execution unit 204 and floating-point execution unit 202 in superscalar processor 200 (see FIG. 4). By using a similar design, the expense of designing and testing new fixed-point and floating-point execution units may be saved.

Also included within processing elements 230–234 are control registers 244. Some control registers 244 may contain status information reflecting the condition of similar registers in control unit 180. Other control registers 244 may be used during operations that require indirect addressing of registers in register file 236.

Memory interconnect 216 in FIG. 4 provides the ability to access a large area of memory in response to executing a single instruction. Memory interconnect 216 in FIG. 4 may also perform a number of data handling and routing functions that route data to one or more processing elements 182 in FIG. 4.

Figure 6:
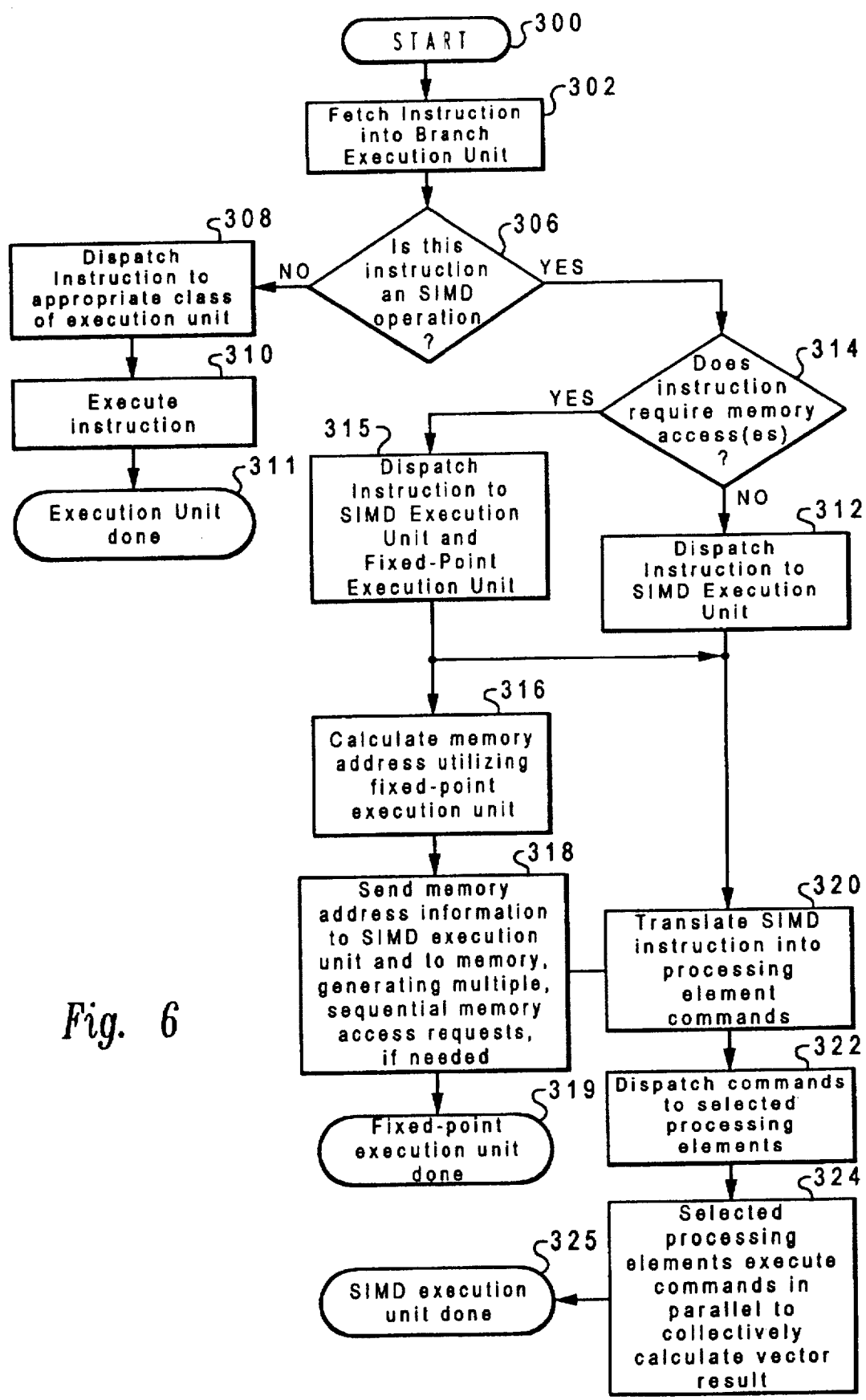
FIG. 6 depicts a high-level logic flowchart representing the process of performing vector operations in an SIMD execution unit in accordance with the method and system of the present invention.

Referring now to FIG. 6, there is depicted a high-level logic flowchart which represents the process of performing vector operations in an SIMD execution unit in accordance with the method and system of the present invention. As illustrated, the process begins at block 300 and thereafter passes to block 302. Block 302 illustrates the process of fetching an instruction into branch execution unit 142 within superscalar processor 200 (see FIG. 4). Branch execution unit 142 may fetch several instructions in a single clock cycle from memory 206 in FIG. 4. Such instructions may belong to one of several classes of instructions, as distinguished by which class of execution unit executes the particular instruction.

Next, the process determines whether or not the instruction represents an SIMD operation, as illustrated at block 306. An operation may be considered an SIMD operation if a single instruction is utilized to cause an operation to be performed on multiple data elements. Such operations include load/store operations to and from SIMD execution unit 156 in FIG. 4, arithmetic operations involving vectors, and logical operations involving vectors. If the instructions does not represent an SIMD operation, the process passes to block 308.

Instructions which are not SIMD operations are then dispatched to an appropriate class of execution unit, as depicted at block 308. For example, branch execution unit 142 will dispatch floating-point arithmetic instructions to floating-point execution unit 202. Thereafter, such dispatched instructions are executed within the appropriate execution unit, as illustrated at block 310. The process of instruction fetching and execution continues, as illustrated at block 302.

Referring again to block 306, if the instruction represents an SIMD operation, the process then determines whether or not the instruction requires access to memory, as illustrated at block 314. An example of an instruction that requires access to memory is an instruction that directs SIMD execution unit 156 to load a vector from memory 206 into selected processing elements 182. SIMD instructions requiring access to memory are then dispatched to both the fixed-point execution unit 204 and SIMD execution unit 156, as depicted at block 315 in FIG. 6. SIMD instructions not requiring access to memory are dispatched only to SIMD execution unit 156, as depicted at block 315.

If the instruction requires access to memory, a memory address is then calculated utilizing fixed-point execution unit 204, as depicted at block 316. Thereafter, the calculated memory address information is sent to SIMD execution unit 156 and to memory 206, as illustrated at block 318.

After any necessary memory addresses have been calculated, the control unit 180 translates the vector operation instruction into commands which may be executed by selected processing elements 182, as depicted at block 320. As illustrated at block 322, such commands are then dispatched to selected processing elements 182 according to the availability and the number of processing elements required to perform the operation. Such commands may also be dispatched out of order.

Once the processing element commands have been dispatched to selected processing elements, such processing elements execute the commands in parallel to calculate collectively a vector result, as depicted at block 324. At this point, a load/store command, which transfers a vector, may also be considered a calculation of a vector result. The process of fetching and executing instructions then continues at block 302 as the process is repeated.

It should be understood that the process of fetching and executing instructions described above may be one of several similar processes being executed concurrently within the superscalar data processing system 140. Thus, branch execution unit 142 begins to fetch another instruction without waiting for the steps represented by the other blocks in FIG. 6 to be completed.

While the invention has been particularly shown and described with reference to a preferred embodiment, it will be understood by those skilled in the art that various changes in form and detail may be made therein without departing from the spirit and scope of the invention.

What is claimed is:

1. A single-instruction, multiple-data (SIMD) execution unit for use in conjunction with a superscalar data processing system having a branch execution unit, a fixed-point execution unit, and a memory unit, said single-instruction, multiple-data execution unit comprising:

a plurality of processing elements for performing arithmetic operations, each of said processing elements capable of executing a particular type of instructions; and a control unit coupled to each of said plurality of processing elements, to said superscalar data processing system, and to said memory unit, wherein said control unit comprises:

means for receiving SIMD-type instructions dispatched from said branch execution unit within said superscalar data processing system, wherein said SIMD-type of instruction is not included among said particular type of instructions;

means for buffering said SIMD-type instructions;

means for translating said SIMD-type instructions into one or more of said particular type of instructions;

means for dispatching each of said particular type of instructions to selected processing elements selected from said plurality of processing elements for processing;

means for loading data from said memory unit into selected ones of said plurality of processing elements; and means for storing data from selected ones of said plurality of processing elements in said memory unit.

2. The single-instruction, multiple-data execution unit according to claim 1 wherein each of said processing elements includes a register file having multiple registers and an arithmetic logic unit coupled to said register file.

3. The single-instruction, multiple-data execution unit according to claim 2 wherein said arithmetic logic unit includes a fixed-point unit for performing fixed-point vector calculations and a floating-point unit for performing floating-point vector calculations.

4. The single-instruction, multiple-data execution unit according to claim 1 wherein said means for receiving SIMD-type instructions dispatched from said branch execution unit includes means for receiving an instruction identifier associated with each of said SIMD-type instructions dispatched from said branch execution unit.

5. The single-instruction, multiple-data execution unit according to claim 1 wherein said means for translating each of said SIMD-type instructions into one or more of said particular type of instructions includes:

an instruction expansion unit for translating each of said particular type of instructions into commands for execution by said selected processing elements.

6. The single-instruction, multiple-data execution unit according to claim 1 wherein said means for loading data from said memory unit into selected ones of said plurality of processing elements includes:

means for calculating a memory address in said fixed-point execution unit; and means for utilizing said calculated memory address for loading data from said memory unit into selected ones of said plurality of processing elements.

7. The single-instruction, multiple-data execution unit according to claim 1 wherein said means for storing data from selected ones of said plurality of processing elements in said memory unit includes:

means for calculating a memory address in said fixed-point execution unit; and means for utilizing said calculated memory address for storing data from selected ones of said plurality of processing elements in said memory unit.

8. A superscalar data processing system for executing vector calculations, said superscalar data processing system comprising:

memory for storing data and instructions;

a plurality of execution units including:
(a) a branch execution unit coupled to said memory;
(b) a fixed-point execution unit coupled to said branch execution unit and said memory; and
(c) a single-instruction, multiple-data execution unit coupled to said branch execution unit and said memory;

means for fetching an SIMD-type instruction from said memory into said branch execution unit;

means for translating said SIMD-type instruction into one or more of a particular type of instructions;

means for dispatching each of said particular type of instruction to said single-instruction, multiple-data execution unit;

means for calculating a memory address utilizing said fixed-point execution unit;

means, within said single-instruction, multiple-data execution unit, for utilizing said memory address to access said memory; and means for executing each of said particular type of instruction within said single-instruction, multiple-data execution unit.

9. The superscalar data processing system for executing vector calculations according to claim 8 wherein said single-instruction, multiple-data execution unit includes a plurality of processing elements for performing arithmetic operations.

10. The superscalar data processing system for executing vector calculations according to claim 9 wherein each of said plurality of processing elements includes a register file having multiple registers and an arithmetic logic unit coupled to said register file.

11. The superscalar data processing system for executing vector calculations according to claim 10 wherein said arithmetic logic unit includes a fixed-point unit for performing fixed-point vector calculations and a floating-point unit for performing floating-point vector calculations.

* * * * *